(12) United States Patent
Charlier et al.

(10) Patent No.: US 8,321,227 B2
(45) Date of Patent: Nov. 27, 2012

(54) METHODS AND DEVICES FOR APPENDING AN ADDRESS LIST AND DETERMINING A COMMUNICATION PROFILE

(75) Inventors: Michael L Charlier, Palatine, IL (US); Kevin L Weirich, Hampshire, IL (US)

(73) Assignee: Motorola Mobility LLC, Libertyville, IL (US)

( * ) Notice: Subject to any disclaimer, the term of this patent is extended or adjusted under 35 U.S.C. 154(b) by 244 days.

(21) Appl. No.: 12/775,252

(22) Filed: May 6, 2010

(65) Prior Publication Data

US 2011/0276330 A1    Nov. 10, 2011

(51) Int. Cl.
*G10L 21/00* (2006.01)
*G10L 13/00* (2006.01)
*G10L 15/00* (2006.01)

(52) U.S. Cl. .............. 704/270.1; 704/258; 704/231

(58) Field of Classification Search ............ 704/10, 704/258, 270.1, 231; 379/406.03
See application file for complete search history.

(56) References Cited

U.S. PATENT DOCUMENTS

| | | | |
|---|---|---|---|
| 6,208,970 B1 * | 3/2001 | Ramanan | 704/270 |
| 6,459,780 B1 * | 10/2002 | Wurster et al. | 379/142.02 |
| 6,697,461 B1 * | 2/2004 | Middlesworth et al. | 379/88.24 |
| 7,386,101 B2 | 6/2008 | Pugliese | |
| 7,724,878 B2 * | 5/2010 | Timmins et al. | 379/88.12 |
| 8,117,036 B2 * | 2/2012 | Bedingfield, Sr. | 704/275 |
| 2003/0032410 A1 | 2/2003 | Saraswat | |
| 2004/0037397 A1 * | 2/2004 | Roby | 379/88.01 |
| 2005/0027536 A1 * | 2/2005 | Matos et al. | 704/270.1 |
| 2006/0145537 A1 * | 7/2006 | Escott | 307/10.1 |
| 2007/0123191 A1 * | 5/2007 | Simpson | 455/345 |
| 2008/0165937 A1 * | 7/2008 | Moore | 379/88.04 |
| 2008/0221883 A1 * | 9/2008 | Kirkland et al. | 704/235 |
| 2010/0033351 A1 * | 2/2010 | Chen et al. | 341/20 |

* cited by examiner

Primary Examiner — Jesse Pullias (57) ABSTRACT

Disclosed are methods and electronic communication devices, such as an in-car speaker device, that can receive via a downloading process, a communication address list from another device to the memory of the electronic communication device and can append a predetermined communication address to the communication address list. The predetermined communication address, which can be to an automated voice recognition based service, can be annunciated first. Also disclosed are methods and electronic communication devices for determining that a communication is with an automated voice recognition based service and then switching from a first call profile to a second call profile. Such a second profile can include different features such as a change of the frequency response of the audio signal of the electronic communication device, and/or reduction or elimination of the echo control, and/or a change in the noise control of the digital signal process.

18 Claims, 4 Drawing Sheets

METHODS AND DEVICES FOR APPENDING AN ADDRESS LIST AND DETERMINING A COMMUNICATION PROFILE

FIELD

Disclosed are methods and devices for appending an address list to include a predetermined address and determining a first or second communication profile for communication in accordance with the predetermined address and other communication.

BACKGROUND

Bluetooth devices are commonly used in conjunction with mobile communication devices as hands-free devices. For example, Bluetooth (BT) devices are configured as headsets and in-car speaker devices that can be paired with mobile communication devices. Hand-free devices typically are conduits for functions of the mobile communication devices such as receiving and transmitting voice signals so that a user does not need to hold the phone up to his/her ear. Typically, a hands-free device will receive voice data from a user via a microphone and transmit the same to a communication device such as a mobile telephone. It can also receive voice data from a mobile communication device and provide voice output via a speaker. For an in-car speaker device, voice output is via a large speaker such as that used in a speaker phone.

BT devices can also receive, store and process data. For example, a BT device may store a phone book and process a communication address such as a telephone number data and transmit the same to a communication device such as a mobile communication device. BT devices are also used in many other paired short range configurations.

More and more often, when users dial a business or service via a mobile communication device or a wired device, users are placed into communication with automated voice recognition based services. These voice recognition based services save money for the service provider in receiving information and in directing calls. For example, a user may contact a bank. The bank may ask for the account number and password, and the user may speak his/her responses. The bank can receive the responses in accordance with its voice recognition digital signal process. A bank transaction may take place based on commands received from the user via the bank's voice recognition based service. At some point during a communication a user may be transferred to a live person. In alternative, a user at some point during a communication with a live person, may be transferred to an automated recognition based service.

DETAILED DESCRIPTION

In storing a phone book, a hands-free BT device can receive downloaded phone book data from another device, such as a mobile communication device or a personal computer. Such may be the case with an in-car speaker phone. A phone book, or communication address list, can include telephone numbers, Internet addresses, or any other communication addresses as well as contact information, such as an identifying name associated with the address. On the other hand, a BT device may be configured to receive a communication address by direct input to the BT device.

Disclosed are methods and electronic communication devices, such as an in-car speaker device, that can receive via a downloading process, a communication address list from another device to the memory of the electronic communication device and can append a predetermined communication address to the communication address list. The predetermined or pre-programmed communication address can be preinstalled in the memory of the electronic communication device or downloaded at any appropriate time so that it can be appended to a phone book of the user. In one example, when "dialed," such a predetermined communication address can connect a user with an information service. A local and/or national information service can help a user find details such as local shops, restaurants, get traffic reports, new and weather updates, stock quotes, sports scores, and flight information. Such an information service may be an automated voice recognition based service.

An information service, such as an automated voice recognition based service may receive communication from a user by its automated voice recognition based service. That is, the information service or any other service may prompt a user for requests and/or commands and then register the voice of the user response to move the query along. The first time a user listens to the prompt, the user may listen to the entire prompt before providing a response. However, after more than one use, a user may be familiar with one or more prompts, and may provide a voice response before the prompt is completed. That is, the user may have no need to hear the continued prompt or the prompt to its completion.

Particularly in the BT hands-free device context, in a normal voice-to-voice call such as a duplex call, certain controls such as the echo controls are biased to the far connection. In a call with a voice recognition assisted service, a profile including an echo priority to the near side connection can provide clean cut-in over the server voice prompts. A profile including an echo priority to the near side connection can make the voice recognition more efficient, and therefore the voice recognition assisted service more reliable. That is, when the BT device is transmitting data to a mobile communication device during a call to an automated voice recognition based service, it may be beneficial to change the profile of the communication from a first profile such as a duplex call to a second profile, such as a server based voice recognition profile for efficiency of processing the prompt responses.

Also disclosed are methods and electronic communication devices for determining that a communication is with an automated voice recognition based service, such as that of a bank, and then switching a digital signal signal process from a first call profile to a second call profile. The first call profile can be a full-duplex call profile that provides two-way communication, such as voice-to-voice communication. The second call profile may limit communication to one way simplex or half-duplex, giving the near side communication priority, such as a server based voice recognition service profile. Such a second profile can include different features such as a change of the frequency response of the audio signal of the electronic communication device, and/or reduction or elimination of the echo control, and/or a change in the noise control of the digital signal process.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

Figure 1:
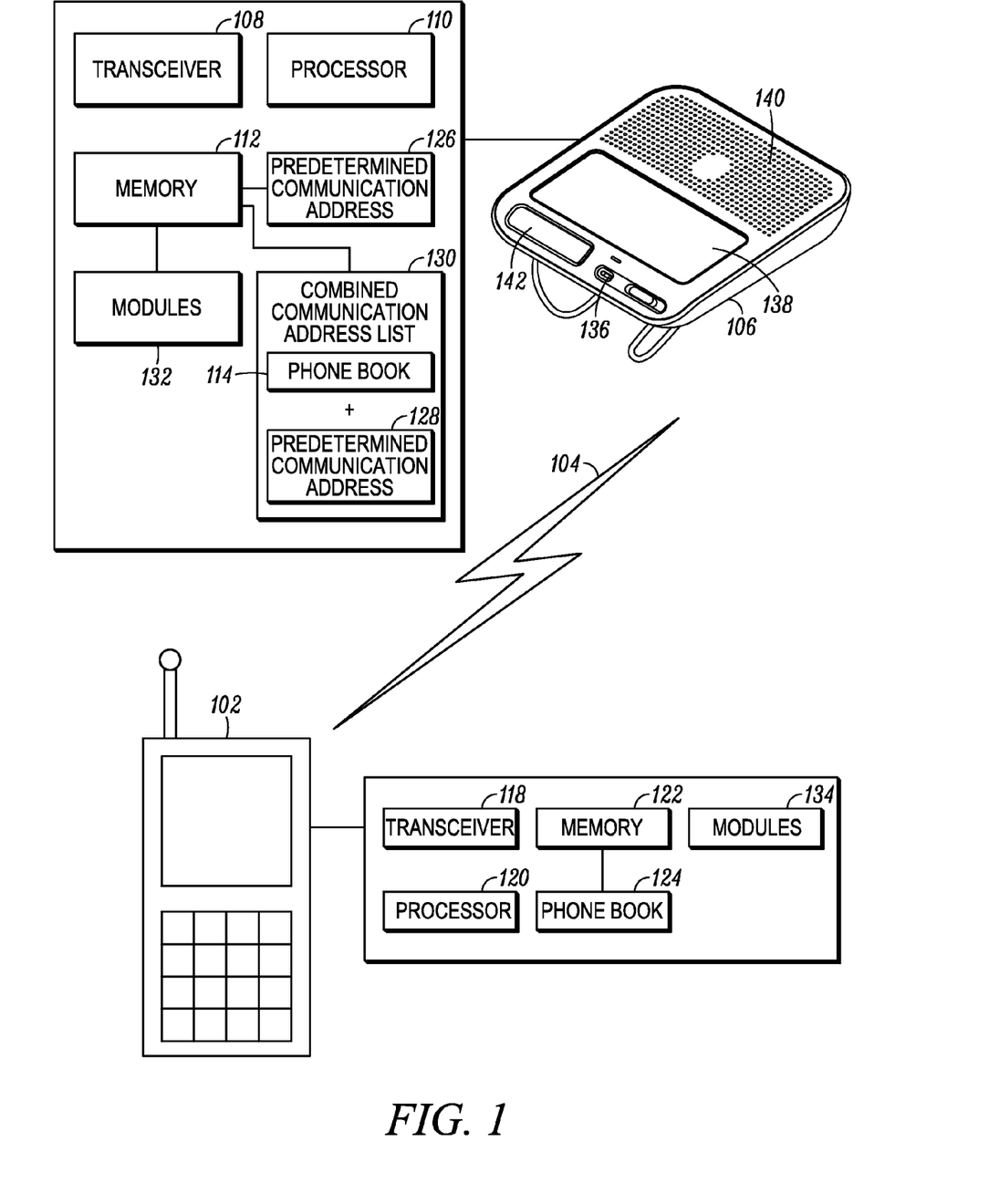
FIG. 1 is a diagram depicting an embodiment of a mobile communication device in communication with an embodiment of another electronic communication device, such as an in-car speaker phone.

FIG. 1 is a diagram depicting an embodiment of a communication device 102, such as a mobile communication device, in communication 104 with an embodiment of another electronic communication device 106, such as an in-car speaker phone. The mobile communication device 102 and the electronic communication device 106 can be BT enabled, and can be paired. It is understood that the mobile communication device 102 and the electronic communication device 106 are depicted to illustrate the invention and that the discussed devices can be any suitable devices.

The mobile communication device 102 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

Both the mobile communication device 102 and the electronic communication device 106 can include transceivers. The transceiver 108 of the electronic communication device 106, for example, can be a BT transceiver. The processor 110 can provide processing for functions of the electronic communication device 106 such as receiving into a memory 112 a phone book 114 downloaded 104 from the mobile communication device 102. The mobile communication device 102 can likewise include a transceiver 118 such as a BT transceiver, and most likely other transceivers. For example, the mobile communication device 102 may be a multi-mode phones can leverage the ubiquity of wide-area networks (GSM and CDMA) with the high performance and low operational costs of local-area WIFI networks. The dual-mode roaming capability can allow wireless handsets to utilize cellular or WIFI networks to place and receive calls, and to provide Internet access for email and Web surfing while the device is in an active mode.

The mobile communication device further includes a processor 120 to upload 104 from a memory 122 a telephone book 124 to the electronic communication device 106. It is understood that the transceivers 108 and 118 can be any type of transceivers so that the phone book stored in memory 122 is downloaded to the memory 112 of the electronic communication device 106. A wired connection between the two devices 102 and 106, such as a USB connection can provide the download 104 as well.

Stored in the memory 112 of the electronic communication device 106 is a predetermined communication address 126. The address 126 can be any type of address, such as an IP address and a telephone number. The predetermined address 126 can be factory installed in the memory 112, downloaded, updated, and/or provided in any suitable manner. As mentioned above, connection to the predetermined telephone address, for example, can connect a user with an information service. A local and/or national information service can help a user find details such as local shops, restaurants, get traffic reports, new and weather updates, stock quotes, sports scores, and flight information. When the phone book 124 is downloaded 104 to the memory 112 of the electronic communication device 106, the predetermined address 126 is appended to the phone book 114. The combined list 130 includes both the predetermined communication address 128 and the phone book 114.

In this way, a method of an electronic communication device 106 includes initiating a process of downloading 104 a communication address list 124 from a different device 102 to the memory 112 of the electronic communication device 106 and from the memory 112 of the electronic communication device 106, accessing a predetermined communication address 126. Appending the predetermined communication address 128 to the communication address list 114 stored in the memory 112 of the electronic communication device 106 to form a combined list 130 in any manner is within the scope of this discussion. Methods as described herein can be carried out by modules 132 and/or 134, and/or in any other suitable manner.

The modules can carry out certain processes of the methods as described herein. Steps of methods may involve modules and modules may be inferred by the methods discussed herein. The modules can be implemented in software, such as in the form of one or more sets of prestored instructions, and/or hardware, which can facilitate the operation of the mobile station or electronic communication device as discussed below. The modules may be installed at the factory or can be installed after distribution by, for example, a downloading operation. The operations in accordance with the modules will be discussed in more detail below.

In one embodiment, the electronic communication device 106 can include a text-to-speech digital signal process or module so that when accessed, combined list 130 can be audibly annunciated to the user. In one embodiment, the first contact annunciated from the combined list 130 is the predetermined communication address 128. The second annunciated contact may be the most contacted address in the phone book 114. For example, if the phone book 114 includes 150 contacts, any number such as 25 of them may have been identified as those with which the user of the electronic communication device 106 has been in contact with most. The processor 110 of the electronic communication device 106 can make the frequency of contact determinations or the processor 120 of the mobile communication device 102 can make those determinations. The process of downloading 104 the phone book 124 from the mobile communication device 102 or any other device to the electronic communication device 106 can happen at any chosen interval and the combined contact list 130 of the electronic communication device 106 can be refreshed.

Depending upon the configuration of the electronic communication device 106, there is any number of manners in which to initiate a communication. For example, if the electronic communication device 106 is enabled with a voice recognition module, then the user can speak to initiate a communication, and the command can be received via a microphone 136. On the other hand, a manual method of initiating a communication to a communication address stored in the combine list 130 is within the scope of this discussion as well. For example, a large button 138 can be tapped by the user to initiate communication. In any event, a text-to-speak module can provide that the first contact in the combined list 130 is annunciated via a speaker 140 or dual speakers of the electronic communication device 106. Echo and noise reduction technology is beneficial. In an in-car speaker phone electronic communication device 106, as depicted in FIG. 1, a text-to-speech annunciating method is also beneficial.

In one embodiment, the first time the mobile communication device 102 and the electronic communication device 106 are paired, the mobile communication device 102's history list of the last 10 (or 25) call can be automatically downloaded. The list can change over time to the mobile communication device's 102 most frequently used contacts when connect to the electronic communication device 106.

Once paired, the electronic communication device 106 can automatically download contact names and numbers of the phone book 124 so that it can announce the name of incoming callers. The electronic communication device 106 may ask permission to accept information access. If accepted, the downloading can begin. Once the downloading commences, the electronic communication device 106 may annunciate "downloading caller ID information." An indicator light may flash a particular color while downloading. When the downloading is complete, which may be 1 to 2 minutes depending upon the number of contacts of the phone book 114, the device 106 can annunciate "download complete."

In one embodiment, to download contacts, a user can hold the mute/favorite contacts button 142. A message can state "connection to <device name> has been dropped, ready to receive V-card." The user can select one or more phonebook contacts on the different device, such as mobile communication device 102 and send it to the electronic communication device 106 via BT. To exit, the user can press the mute/favorite contacts button 142. Otherwise the electronic communication device 106 can automatically exit after 1 or 2 minutes of inactivity (no button presses). When exiting, a use may hear "connected to <device name>" as the electronic communication device 106 connects back to the mobile communication device 102.

While FIG. 1 depicts a mobile communication device 102 and an in-car speaker phone electronic communication device 106, the system could be, for example, a personal computer downloading a phone book and a mobile communication device receiving the phone book and appending the pre-determined communication address wirelessly, or via a wire. It is understood that any two devices configured as described are within the scope of this discussion.

Figure 2:
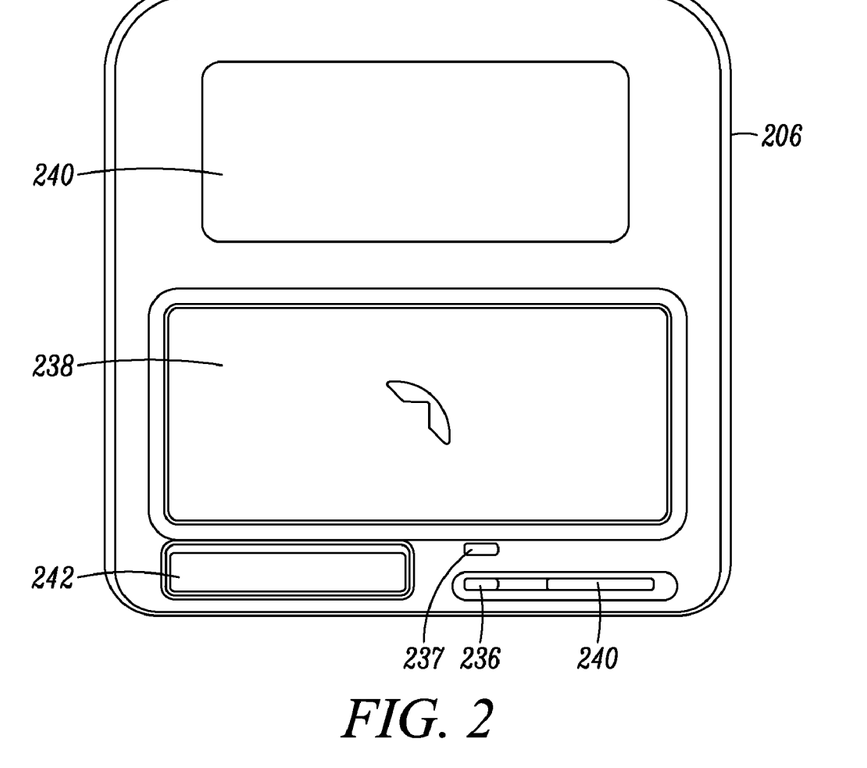
FIG. 2 depicts a top view of an embodiment of the electronic communication device similar to that of FIG. 1.

FIG. 2 depicts a top view of an embodiment of the electronic communication device 206 similar to that of FIG. 1. As mentioned, the electronic communication device 206 can be any device to which a communication address list 114 (see FIG. 1) can be downloaded and which can store the predetermined communication address 126 that can be appended 130 to the communication address list 114.

In the electronic communication device 206, the function buttons can be configured so that when they are pressed, their function is context dependent. For example, when the device is at rest, when the user presses the large button 238, communication can be initiated. Also, when the device is at rest, when a call is coming in, the user may press the large button 238 to receive a call. Also, when on a call, the user can press the large button 238 to end the call. The power button 240 may be positioned next to the microphone 236. A light 237 can blink when the microphone 236 is off. In the alternative, the light 237 can blink when the microphone 236 is on.

Prior to initiating communication by pressing the large button 238, the user can press the combined favorite contacts/mute button context dependent 242 which can also be context dependent. When the device is at rest, by pressing the button 242 the combined phone book list 130 (see FIG. 1) can be read by the text-to-speech function. In one embodiment, the predetermined communication address 126 is annunciated by a text-to-speech announcement prior to other contacts being read. If the list is ordered as a most frequent call list, the most frequent contact in the combined phone book 130 can be annunciated.

Figure 3:
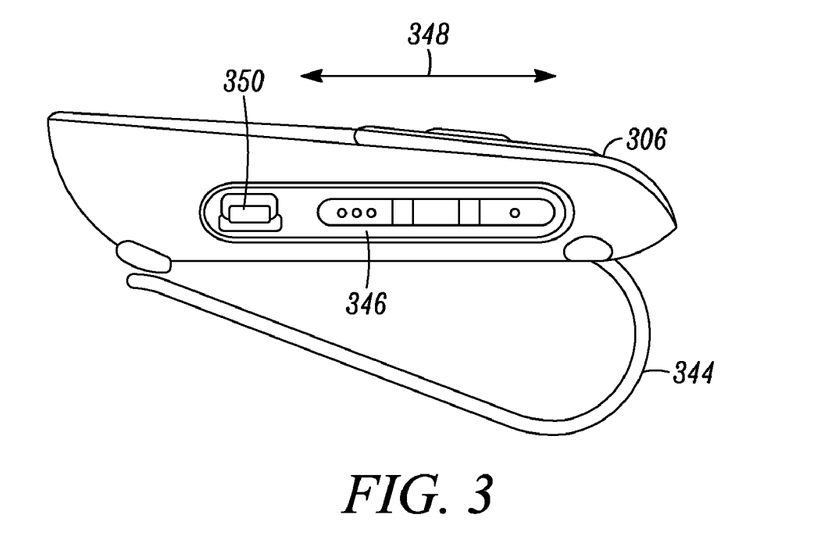
FIG. 3 depicts a side view of an embodiment of the electronic communication device similar to that of FIG. 1.

FIG. 3 depicts a side view of an embodiment of the electronic communication device 206 that in this example is an in-car speaker phone. The visor clip 344 can be used to position the in-car speaker phone on a visor of a car. Such an in-car speaker phone 306 for example can be built into the console of the car, and an electronic communication device 306 with any amount of processing power is within the scope of this discussion. Accordingly, while the electronic communication device 306 described herein can be manually operated, with sufficient processing power, the device 306 can provide speech recognition functionality. If not, an enabled mobile communication device 102 may provide the voice recognition capability.

As mentioned, in one embodiment, a favorite contacts/mute button 242 (see FIG. 2) can be pressed prior to initiating communication, and the predetermined communication address 126 (see FIG. 1) can be read first. A scroll/volume context dependent button 346 can be moved in a direction 348 to move through the combined phone list 130.

As mentioned above, a wired connection between the two devices 102 and 106 (see FIG. 1), such as a USB connection can provide the download 104 as well. A micro USB connector 350 is illustrated. Accordingly, the download of the phone book 114 can be from any suitable device, such as a PC. Alternatively or additionally, the USB connector can provide power for charging the batteries.

Figure 4:
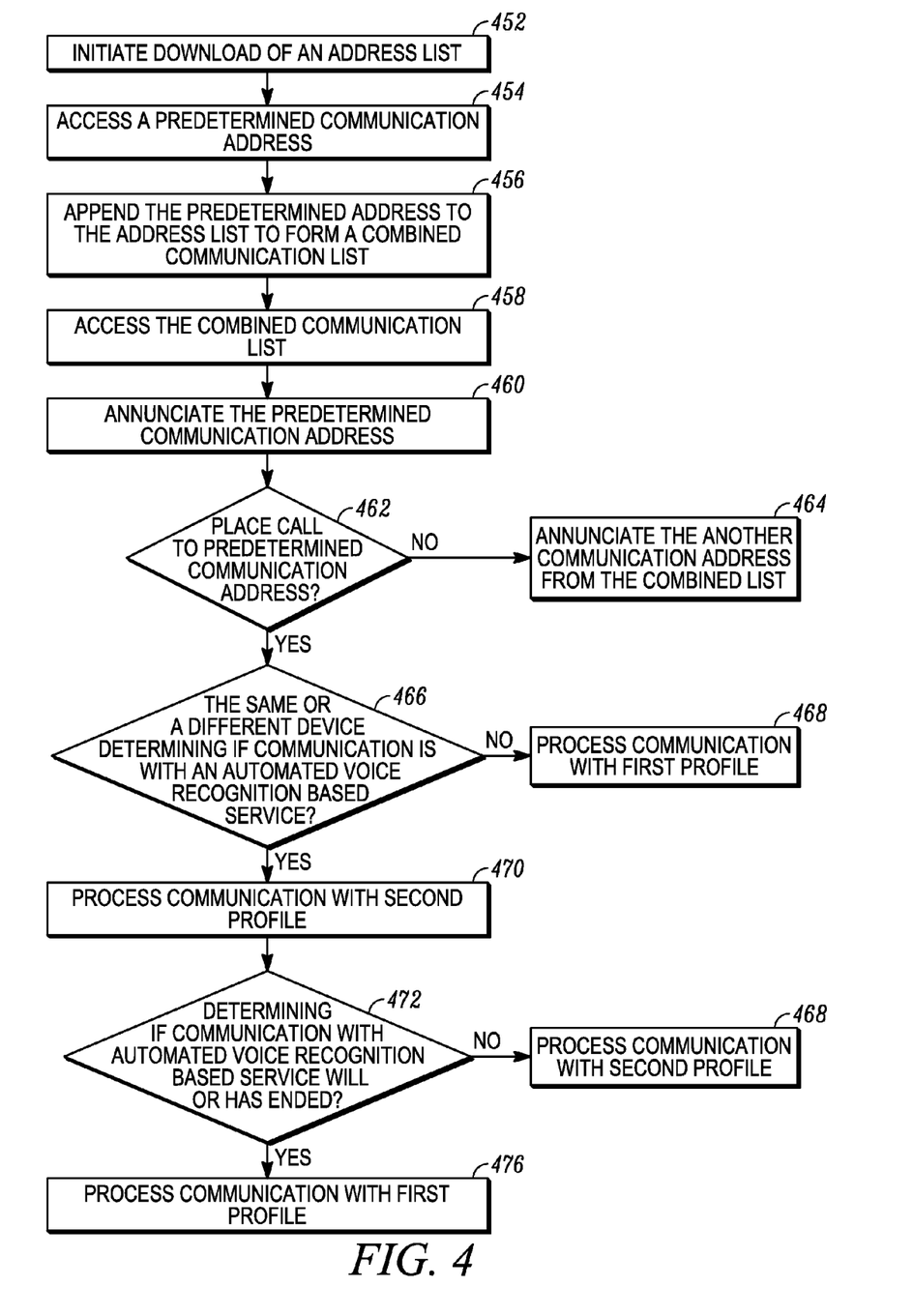
FIG. 4 is a flow chart of an embodiment of a method of an electronic communication device and/or a mobile communication device including determining whether the communication is with an automated voice recognition based service.

FIG. 4 is a flow chart of an embodiment of a method of an electronic communication device and/or a mobile communication device including determining whether the communication is with an automated voice recognition based service.

As mentioned above, the electronic communication device 106 and the mobile communication device 102 can include modules 132 and 134 respectively, to carry out steps of the described methods. Also, depending upon the processing power and communication capabilities of an electronic device, any of the described steps can be carried out by one device.

A downloading module 132 can be configured to initiate a process of downloading 452 a communication address list 124 (see FIG. 1) from another device to the memory 112 of the electronic communication device 106. A communication accessing module 132 can be configured to access 454 from the memory 112 of the electronic communication device 106 a predetermined communication address 126. An appending module 132 can be configured to append 456 the predetermined communication address 126 to the communication address list 114 to form a combined list 130.

As illustrated in FIG. 1 and then again described by FIG. 4, the combined address list 130 (see FIG. 1) includes the phone book 114 and predetermined communication 128. The actual configuration of the information in memory 112 is dependent upon implementation. That is whether the predetermined communication address 126 is appended by copying it to the combined communication address list 130, or whether it is accessed when the phone book 114 is accessed, is a matter of implementation. The result is that the predetermined communication address 128 is annunciated when the phone book 114 is accessed by the user as if the predetermined communication address 128 and the downloaded phone book 114 are stored together as a combined communication address list 130.

A communication address accessing module 132 (see FIG. 1) can be configured to access 458 the combined communication address list 130. An annunciating module 132 can be configured to annunciate information 460 relating to the predetermined communication address 128 prior to annunciating information relating to other communication addresses 114 in the combined communication address list. As discussed above, the annunciating module 132 can be configured as a text-to-speech module 132.

The user may wish to place a call to the predetermined communication address 462. If not, then the annunciating module 132 (see FIG. 1) will annunciate 464 another communication address from the combined communication address list 130. If the user wishes to place a call to the predetermined communication address 128, the same or a different device such as a device similar to mobile communication device 102 can determine 466 if the communication is with an automated voice recognition based service. As mentioned, the downloading of the phone book 124 can be from any source, and does not have to be from the same device that is processing the communication of step 462.

If the communication to the predetermined communication address 462 is not initially with an automated voice recognition service 466, then the communication will be processed 468 with the first profile. A first profile may be a voice-to-voice profile. That is, if there is a conversation, that can be between two or more people, where it is possible that at least two people can be speaking at the same time, and each will hear the other, the profile may be "full-duplex." It is understood that depending upon the noise situations on either side of the conversation, the device may defer to "half-duplex." Other configurations are possible so that a conversation between two people can take place. A first profile in this context is meant to cover all conversational configurations.

If the communication to the predetermined communication address 462 is initially with an automated voice recognition service 466, then the communication will profile will be processed 470 with a second profile. As will be discussed in more detail when discussing FIG. 5, various methods for determining an automated voice recognition based service are within the scope of this discussion. Also, as will be discussed in more detail when discussing FIG. 5, the second profile can be characterized as a server based voice recognition service profile and can include, for example, adjusting an echo control, a noise control and/or a frequency response.

At some point during the communication with an automated voice recognition service, the communication may be switched to a voice-to-voice profile. For example, a user may have been prompted and then responded to one or more prompts so that the service would then provide a conversation with person instead of the automated voice recognition service. The embodiment of the illustrated method provides determining 472 if the communication with the automated voice recognition service will or has ended. If not, the communication is processed 474 with the second profile. If yes, the communication will be processed 476 with the first profile.

Determining 472 if the communication with the automated voice recognition service will or has ended can include detecting an indicator of an audio signal of the automated voice recognition based service. The indicator can be an audible or inaudible signal, such as a beep, or a header in a stream of data, that indicates that the automated voice recognition service will or has ended. The receiving device, such a mobile communication device 102 (see FIG. 1), can be configured to receive such an indicator.

In another embodiment, an indicator can be recognition of a word or a string of words. For example, an indicator that automated voice recognition service will or has ended can include detecting a trigger such as "one moment while I connect you" or voice call side "hello." In such a case, the device will process the communication with the first profile.

Upon determining 472 if the communication with the automated voice recognition service will or has ended, if the answer is no, then the communication will be processed 474 with the second profile. If the answer is yes, then the communication will be processed 476 with the second profile.

Figure 5:
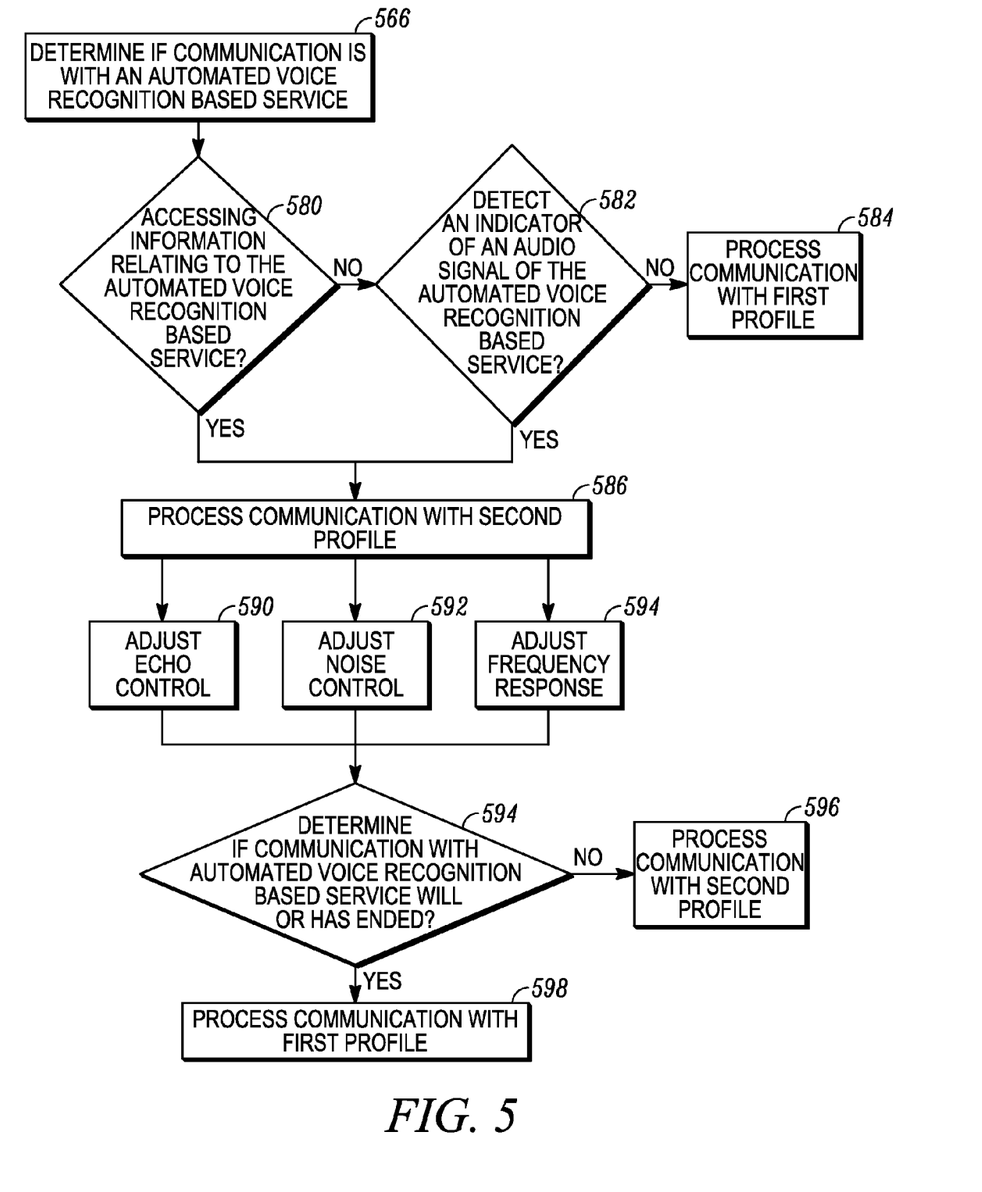
FIG. 5 is a more detailed flow chart of an embodiment of a method of an electronic communication device and/or a mobile communication device including determining whether the communication is with an automated voice recognition based service.

FIG. 5 is a more detailed flow chart of an embodiment of a method of an electronic communication device and/or a mobile communication device including determining whether the communication is with an automated voice recognition based service. As mentioned above, depending upon the processing power and communication capabilities of an electronic communication device, any of the described steps can be carried out by one device or can be shared by more than one device.

During any communication, an automated voice recognition based service may be utilized. As mentioned above, the predetermined communication address 128 (see FIG. 1) may be accessed by the user. However, other communication may include an automated voice recognition based service. For example, a user may be speaking with another person, who may transfer the user to an automated voice recognition based service, which may then transfer the user back to a voice-to-voice communication. Any variation of switching between automated voice recognition based service and voice-to-voice communication is within the scope of this discussion.

The embodiment of the method of FIG. 5 includes a step of determining 566 if the communication is with an automated voice recognition based service. In one embodiment, information can be accessed 580 that can indicate that the communication is with an automated voice recognition based service. For example, a communication address used for the communication can be such information.

In another embodiment, an indicator can be detected 582 that can indicate that the communication is with an automated voice recognition based service. An indicator can be an audible or inaudible signal, such as a beep, or a header in a stream of data, that indicates that the communication is with an automated voice recognition service. In yet another example, an indicator can be a trigger such as a word or phrase can indicate that the communication is with an automated voice recognition service. Moreover, an indicator may be the tone of the voice used by an automated voice recognition based service.

The determination 566 may occur at various time intervals or when a communication is placed or received. If the communication is not with an automated voice recognition based service, the communication is processed 584 with the first profile. If either step 580 and/or 582 yields a yes answer, then the communication is processed 586 with the second profile. As discussed above, the second profile can be characterized as a server based voice recognition service profile and can include, for example, adjusting 588 an echo control, adjusting 590 a noise control and/or adjusting 592 a frequency response. Adjusting can include reducing or eliminating the controls.

As mentioned above, a communication can change from a voice-to-voice communication, to communication with an automated voice recognition based service, and visa versa. The embodiment of the method of FIG. 5 includes determining 594 if the combination with an automated voice recognition based service will or has ended. Examples of trigger words or phrases to indicate this state include "one moment while I connect you" or voice call side "hello." If the determination is not made, then the communication is process 596 with the second profile. If the answer is yes, then the communication is processed 598 with the first profile.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method of an electronic communication device having a memory, a controller, and a speaker comprising:
    initiating by the controller a process of downloading a communication address list from a different device to the memory of the electronic communication device;
    from the memory of the electronic communication device, the controller accessing a predetermined communication address;
    appending by the controller the predetermined communication address to the communication address list stored in the memory of the electronic communication device to form a combined communication address list;
    receiving by the controller from the memory a selection of a communication address of the combined address communication list;
    initiating by the controller a communication in accordance with the communication address; and
    causing a different device to determine that the communication in accordance with the communication address is with an automated voice recognition based service.

2. The method of claim 1, comprising:
    accessing by the controller the combined communication address list stored in the memory of the electronic communication device; and
    annunciating by the speaker information relating to the predetermined communication address prior to annunciating information relating to other communication addresses in the combined communication address list stored in the memory of the electronic communication device.

3. The method of claim 1, wherein upon determining that the communication in accordance with the predetermined communication address is with an automated voice recognition based service, the method of the electronic communication device comprises:
    switching by the controller a digital signal process from a first profile to a second profile.

4. The method of claim 3, wherein the first profile is a type of duplex call profile.

5. The method of claim 3, wherein the second profile is a server based voice recognition profile.

6. The method of an electronic communication device having a controller and a transceiver, comprising:
    determining by the controller if a communication received by the transceiver is with an automated voice recognition based service;
    processing by the controller with a server based voice recognition profile in response to determining that the communication is with an automated voice recognition based service; and
    processing by the controller with a call profile in response to determining that the communication is not with an automated voice recognition based service.

7. The method of claim 6, wherein the call profile is a type of duplex call profile.

8. The method of claim 6, wherein determining that the communication is with an automated voice recognition based service comprises the controller detecting an indicator of an audio signal of the automated voice recognition based service.

9. The method of claim 6, wherein determining that the communication is with an automated recognition based service comprises the controller accessing information relating to the automated voice recognition based service.

10. The method of claim 6, wherein processing with the server based voice recognition profile, comprises:
    adjusting by the controller a frequency response of an audio signal of the electronic communication device.

11. The method of claim 6, wherein processing with the server based voice recognition profile, comprises:
    adjusting by the controller an echo control of a digital signal process.

12. The method of claim 6, wherein processing with the server based voice recognition profile, comprises:
    adjusting by the controller a noise control of a digital signal process.

13. The method of claim 6, further comprising determining that the communication will switch to a communication that is not with an automated voice recognition based server by detecting by the controller an indicator of an audio signal of the automated voice recognition based service.

14. The method of claim 6, further comprising determining that the communication has switched to a communication that is not with an automated voice recognition based server by detecting by the controller an indicator of an audio signal of the automated voice recognition based service.

15. The method of claim 6, comprising:
  initiating by the controller a process of downloading a communication address list from another device to a memory of the electronic communication device;
  from the memory of the electronic communication device, accessing by the controller a predetermined communication address; and
  appending by the controller the predetermined communication address to the communication address list stored in the memory of the electronic communication device to form a combined communication address list.

16. An electronic communication device, comprising:
  a controller;
  a memory in communication with the controller;
  a downloading module configured to initiate a process of downloading a communication address list from another device to the memory of the electronic communication device;
  a communication accessing module in communication with the controller and the memory, configured to access from the memory of the electronic communication device a predetermined communication address;
  an appending module in communication with the controller and the memory, configured to append the predetermined communication address to the communication address list stored in the memory of the electronic communication device to form a combined address list;
  wherein the controller receives from the memory a selection of a communication address of the combined address communication list and initiates a communication in accordance with the communication address; and
  wherein the electronic communication device causes a different device to determine that the communication in accordance with the communication address is with an automated voice recognition based service.

17. The electronic communication device of claim 16, comprising:
  a communication address accessing module in communication with the controller and the memory, configured to access the combined communication address list stored in the memory of the electronic communication device; and
  an annunciating module in communication with the controller and the memory, configured to annunciate information relating to the predetermined communication address prior to annunciating information relating to other communication addresses in the combined communication address list stored in the memory of the electronic communication device.

18. The electronic communication device of claim 17, wherein the annunciating module is a text-to-speech module.

* * * * *